June 21, 1960 T. S. ALLEN ET AL 2,942,039
MANUFACTURE OF ETHYL CHLORIDE
Filed Nov. 18, 1958
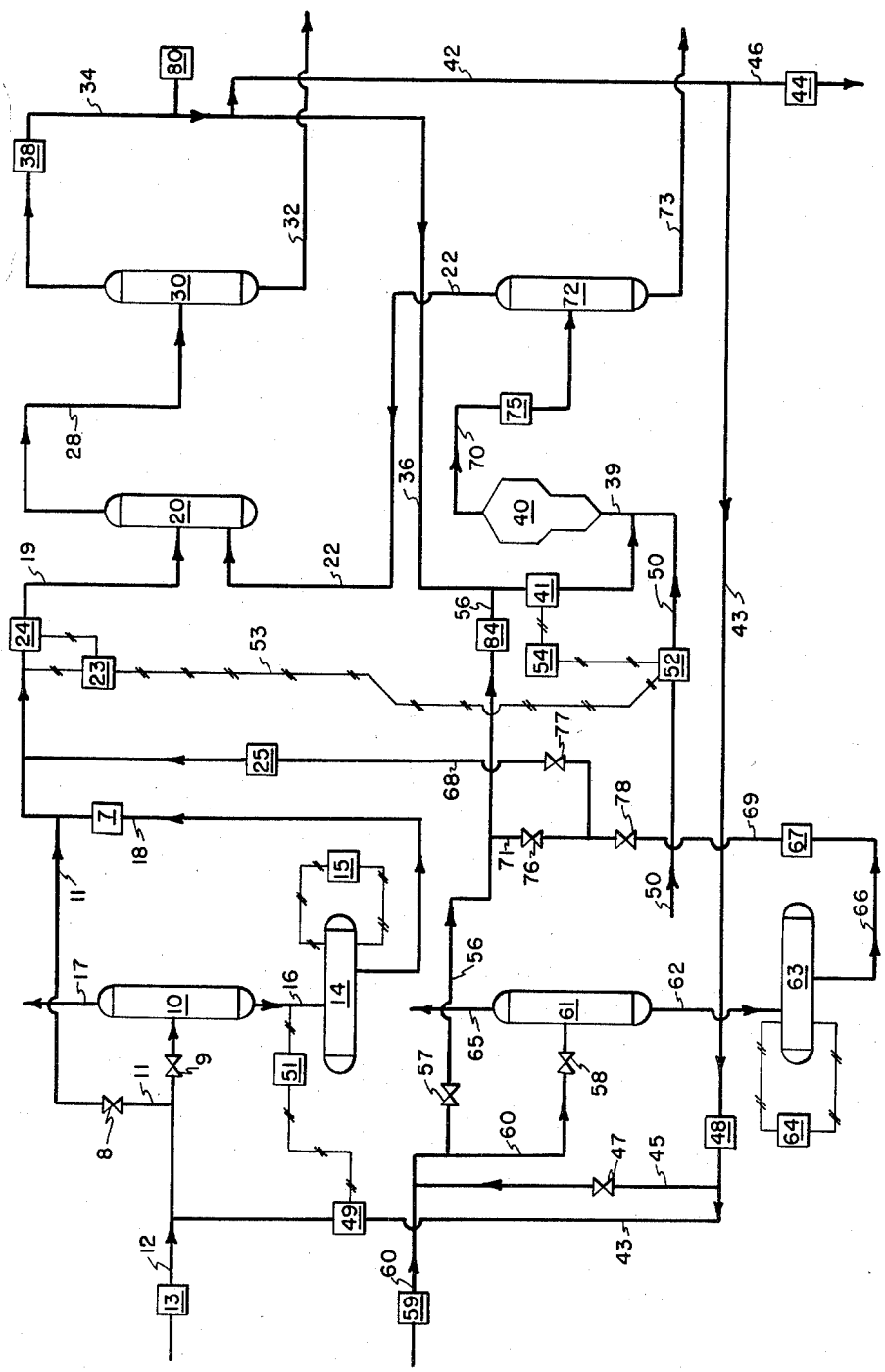

2,942,039

MANUFACTURE OF ETHYL CHLORIDE

Thomas S. Allen, Merle L. Gould, Arthur J. Haas, Jr., and Harry E. O'Connell, Baton Rouge, La., assignors to Ethyl Corporation, New York, N.Y., a corporation of Delaware Filed Nov. 18, 1958, Ser. No. 774,535

4 Claims. (Cl. 260—662)

INTRODUCTION

This invention relates to the manufacture of ethyl chloride and more particularly to an integrated process whereby ethyl chloride is produced by hydrochlorination of ethylene and additional ethyl chloride or other chlorinated ethanes are produced by chlorination of ethane, the hydrogen chloride by-product from the chlorination reaction being reacted with the ethylene in the hydrochlorination reaction.

STATEMENT OF PROBLEM

Ethyl chloride manufactured commercially at the present time is predominantly produced by the hydrochlorination of ethylene. By virtue of the inherently lower cost of ethane, the commercial production of ethyl chloride by chlorination is very attractive. The latter reaction, however, results in only about 50 percent utilization of the valuable chlorine, the remaining chlorine being consumed in the formation of hydrogen chloride. It has previously been suggested to combine these processes such that the hydrogen chloride produced in the chlorination reaction would be just equivalent to that required in the hydrochlorination reaction. However, in practice, complete integration of the two processes is difficult due to the criticality of the hydrogen chloride concentration in the hydrochlorination reaction. Commercially available hydrocarbon feed stocks normally fluctuate periodically with respect to the ethylene and ethane ratio, and since the quantity of hydrogen chloride formed in the chlorination process and the products of this invention is dependent not only on the quantity of chlorine fed to the reactor but also on the ethane to chlorine feed ratio, it is essential that the quantities of all of the feed streams, including ethylene, ethane, chlorine, and the by-product hydrogen chloride be maintained extremely constant. In addition, the efficiency of the hydrochlorination process requires a very close control over the ethylene to hydrogen chloride feed ratio, normally requiring a molar excess of chlorine of between about 1 and 15 percent. In addition to the above mentioned fluctuation in composition of hydrocarbon feed stocks, frequently feed streams of drastically different character are provided. Thus, a stream consisting of a mixture of ethane and ethylene might be available. Alternatively, separate feed streams highly concentrated in ethane and ethylene, respectively, might be provided. Still an additional combination of hydrocarbon feeds is the combination of an ethane rich feed stream, and an ethane-ethylene feed stream of variable composition, particularly with respect to the ethylene content.

STATEMENT OF OBJECTS

It is accordingly an object of this invention to provide an improved process for the manufacture of ethyl chloride. Another object is to provide a method for completely integrating the hydrochlorination and chlorination processes whereby an accurately controlled quantity of hydrogen chloride is continuously formed in the chlorination reaction and is fed to the hydrochlorination reaction to maintain a critical concentration excess in relation to the ethylene feed. Still another object is to provide a process of the above type which will automatically compensate for relatively wide variations in the ethane:ethylene ratio in the fresh hydrocarbon feed to the process. Yet another object is to provide an integrated process generally capable of utilizing hydrocarbon feed streams of different categories, as cited above, and further to provide a novel control and operating technique for an integrated process employing such variable streams. Other objects and advantages of this invention will become more apparent from the following description and appended claims.

STATEMENT OF INVENTION

We have now found that the extremely accurate and intimate control necessary in the integration of a hydrochlornation reaction with a chlorination reaction can be accomplished if a substantial excess of ethane is continuously fed to the process, i.e. normally above about 15 mole percent and preferably above 20 percent excess, based on the quantity of ethane reacted in the chlorination reaction. While this excess can be affectively and, in most cases, economically obtained by using a hydrocarbon feed stream containing this desired excess of ethane, venting or reusing the same in other processes, the preferred embodiment of this invention involves the use of a hydrocarbon feed stream containing only a minor excess of ethane and also the use of a recycle of substantial quantities of an ethane-rich stream from the process to enrich the fresh hydrocarbon feed stream, the recycle being obtained from an off-gas from the hydrochlorination reaction. Thus, in carrying out the present process, the ethane continuously passed through the hydrochlorination reactor always contains the desired excess of ethane, whether using an ethane-rich hydrocarbon feed or not.

The excess ethane employed in the present process materially increases the ease and degree of control possible over the chlorination reaction conditions; permits convenient control of the ethane and chlorine feed streams to the chlorination reaction in response to variations in the ethylene feed to the hydrochlorination reaction; provides an accurate and effective control over the hydrogen chloride produced and fed to the hydrochlorination reaction; and, of prime importance, permits uniform, continuous operation in spite of variations in the composition of the hydrocarbon feed stream, particularly of the relative concentrations of ethane and ethylene therein.

The manufacturing process employed in the present invention includes a hydrochlorination step and a chlorination step, in which a fresh hydrocarbon stream containing the ethylene component provided for the operation, is fed first to the hydrochlorination step. The ethylene contained in this feed is reacted under well known conditions with hydrogen chloride formed as a by-product in the chlorination reaction, discussed more fully below. The ethyl chloride so-formed is accompanied by quantities of ethane gas. The ethyl chloride component or product is preferably separated from the reaction product and a part of the off-gas therefrom, containing substantial concentrations of ethane, is passed to the chlorination step wherein it is reacted with chlorine to produce ethyl chloride or higher chlorides, depending primarily on the ethane to chlorine mole ratio in the chlorination feed. This reaction is well known and can be conducted photochemically or thermally in various type reactors, e.g. a tube reactor or a fluidized bed reactor.

Fresh ethane component or feed to the integrated system can be provided as a high concentration, or almost pure ethane feed stream, or as a mixture with the ethylene feed stream, or, in some instances, as a jointly provided component including an ethane-rich feed stream plus an ethane component accompanying the ethylene feed. Various modes of providing the introduction of the fresh ethane to the reaction system are feasible. For example, and as is described more fully hereinafter, the fresh ethane component can be introduced directly to the chlorination step, especially when there is no accompanying copresent ethylene. In other instances, when the bulk of the ethane component is in admixture with the ethylene feed component, the ethane can be introduced jointly with such ethylene in the hydrochlorination reactor and since the ethane does not appreciably react under hydrochlorination conditions, it will thus be provided for the chlorination step.

When producing predominantly ethyl chloride, the mole ratio of chlorine:ethane in the chlorination step is generally between about 0.2 to 0.5, the ethyl chloride product or other chlorinated alkane products can then be recovered, such as by liquefication and the hydrogen chloride, formed as a by-product, is passed to the hydrochlorination reactor for reaction with ethylene, as noted above. The unreacted ethane, if any, can be separated and, if desired, recycled to the chlorination reaction. Preferably, however, it is returned to the hydrochlorination reaction to additionally increase the ethane concentration therein and, in effect, additionally improve the controllability of the process.

The excess ethane recovered from the hydrochlorination reaction, not sent to the chlorination step, as noted above, can be vented or used in other processes. However, if the fresh ethane feed to the system is in amounts of less than about 15 to 20 percent excess ethane, a portion of the vent ethane (hydrochlorination off-gas) is continuously recycled to enrich the fresh feed with ethane up to the required ethane excess. Normally, even when using a recycle, it is preferred to have a minimum ethane excess in the hydrocarbon make-up of not less than 5 percent, based upon the ethane reacted in the chlorination step. When using such a recycle, particularly when the feed gas contains even small quantities of methane and other low boiling impurities, it is desirable to pass the recycled stream through a tower or other separation unit to remove such impurities. This prevents an undue build up of methane and similar gases which tend to chlorinate when present in appreciable concentrations. With methane, for example, it is frequently desirable to maintain a maximum concentration of below 20 percent methane in the chlorination feed stream, and preferably below 10 percent, based on the total hydrocarbon feed. Such demethanization can be accomplished, for example, by a refrigerated tower, removing the desired ethane as a liquefied fraction. Most generally, the recycled stream is combined with the fresh hydrocarbon stream prior to demethanization so that all of the undesired impurities can be removed in a single operation.

GENERAL CONTROL OF INTEGRATED PROCESS

The use of a substantial excess of ethane component, and particularly the presence in an integrated system of an appreciable quantity in recycle operations, makes practical the integration of hydrochlorination and chlorination operations and materially contributes to stable operation of both reaction zones involved. In order to achieve uniform operating conditions, the control procedures and steps involved are particularly important. In general, control of the process must be made on the quantity of ethylene provided for the hydrochlorination reaction. It is normally most convenient to measure and determine the quantity of ethylene component input by direct measurement, although in some embodiments, a measure of the ethane feed concentration in a mixed ethane-ethylene stream, plus a measure of the rate of flow of said stream, would be an equivalent determination of the ethylene feed. With the ethylene feed adjusted and determined, the chlorine input to the system is adjusted in relation to the ethylene feed flow. In addition, the net ethane feed to the chlorination zone should be adjusted, to provide a preselected proportion of ethane to chlorine fed to said reaction zone. As indicated heretofore, when ethyl chloride is desired, the ethane is introduced to the chlorination zone in excess, the chlorine:ethane ratio being from about 0.15:1 to 0.5:1. By contacting and reacting the chlorine fed to the system in the chlorination zone substantially only with the ethane feed, and possibly with minor quantities of other alkane components, the chlorine fed is substantially equivalent to the moles of hydrogen chloride generated by the process. In other words, the quantity of hydrogen chloride is substantially independent of the product composition from the chlorination process, i.e. the percentage of higher chlorinated products. However, the ethane feed, while dependent upon the ethylene feed, is also dependent upon the desired chlorinated alkane product. Thus, if a substantial preponderance of ethyl chloride is preferred, lower mole ratios of chlorine:ethane should be employed, i.e. from about 0.2 to 0.5. However, if substantial quantities of the dichloroethanes or higher chloroethanes are desired, this ratio should be increased accordingly. Thus, depending upon the chlorinated product desired, the ethane feed to the chlorinator can be set directly from the feed of ethylene to the hydrochlorination step.

Correlation of the chlorine and ethane feeds to the chlorinator with the ethylene feed can be made manually or automatically but they must never vary appreciably over any substantial period. Many instruments are known and commercially available which are wholly suitable for this purpose.

In addition to the primary control operations described above, a supplementary control is provided based upon the quantity of hydrogen chloride found in the product gas stream from the hydrochlorination reaction zone. The hydrochlorination is normally carried out with at least an equal mole proportion of hydrogen chloride relative to the ethylene component introduced into the hydrochlorination zone. Even under such circumstances, a minor amount of hydrogen chloride is found unreacted in the product gases therefrom. It is even more desirable in practically all instances, to use a moderate excess of hydrogen chloride relative to the ethylene feed, and in such instances the proportion of hydrogen chloride in the overhead stream will be somewhat higher. It is found, that this particular stream and component provides a particularly sensitive criterion for adjustment of the chlorine rate within a "fine" band, that is to provide further stabilized conditions. Accordingly, this supplementary control comprises inversely adjusting the chlorine feed to the integrated operations to provide uniform hydrogen chloride concentration at the point indicated.

Lastly, an overriding control is provided by means of a partial vent of the excess ethane in the system. This vent comprises generally releasing, for fuel purposes or subsequent chemical processing elsewhere, the ethane which is introduced in excess of that consumed. Such venting is accomplished by releasing, in response to pressure, or at a defined flow rate providing a uniform pressure, and preferably by venting the ethane component of the product gases from the hydrochlorination reaction, after segregation of the ethyl chloride desired product therefrom. When the fresh hydrocarbon feed contains above 15 to 20 mole percent excess of ethane, all of the ethane not passed to the chlorination step is generally vented and thus the ethane feed control to the chlorination automatically compensates for fluctuations in the composition of the feed hydrocarbon stream. However, when the fresh hydrocarbon feed has insufficient ethane and is adjusted by enriching its ethane content with additional ethane from the hydrochlorination off-gas, it is necessary to proportionate the quantity vented and the quantity recycled to maintain a constant hydrocarbon feed composition to the hydrochlorination reaction. In the most preferred embodiment, an appreciable quantity of ethane is continuously recycled and the quantity is adjusted by a variable valve which is responsive to an analyzer in the hydrochlorination feed stream. The latter analyzer, for example an infrared analyzer, can measure either the percent ethane or ethylene in the stream and effect variations in the recycle control valve to maintain a constant percent ethane or ethylene, as the case may be. Using a continuous recycle, either increases or decreases in the ethane concentration in the feed will be automatically made up by the recycle stream to maintain a constant gas flow and gas composition to the hydrochlorination step.

DESCRIPTION OF FLOW DIAGRAM

The invention can best be understood by reference to the flow diagram of the figure. The figure shows a schematic arrangement of apparatus suitable for virtually all embodiments of the process and the control technique of the invention. As heretofore discussed, the several particular embodiments may include a single hydrocarbon feed stream available including both the ethane and ethylene components, or two enriched streams predominating in ethylene and ethane respectively, and two streams including an ethane stream and an ethane-ethylene stream of varying composition.

From the description below, it will be clear that certain apparatus units illustrated in the figure can be omitted in specific instances when desired.

Referring to the figure, the principal apparatus vessels include in all instances a hydrochlorination reactor 20, and a chlorination reactor 40. Fractionating columns 30, 72 are provided for treatment of the reaction product streams from the hydrochlorination zone 20 and the chlorination zone 40 respectively. In addition, frequently a preliminary rectification or methane stripping of a hydrocarbon feed stream is necessary and for this purpose demethanizing towers 10, 61 may be provided.

Feed conduits to the system include a first hydrocarbon feed line 12, a second hydrocarbon feed line 60, and a chlorine feed line 50. As previously mentioned, in some instances, the hydrocarbon feed streams contain appreciable amounts of methane or hydrogen impurities therein, and these components are preferably removed prior to feeding to the reactions of the process. For this purpose, the demethanizing towers 10 and 61 can be provided. Thus, in the case of a hydrocarbon feed stream introduced to feed line 12, by closing valve 8 in a by-pass line 11, and opening valve 9, the feed hydrocarbon can be directed to the demethanizer 10 for stripping off as an overhead fraction and discard through line 17, a methane stream. In such operations a liquid bottoms is discharged from the demethanizer 10 through the bottom lines 16 to a holdup tank 14. A transfer line 18 from the holdup tank 14 feeds the liquid bottoms through a vaporizer 7, in which heat is supplied to vaporize the hydrocarbon to the gas phase and allow its feed to the system through line 19 which introduces the ethylene to the hydrochlorination reactor 20.

A similar system is provided in conjunction with the second hydrocarbon feed line 60. This system again includes a demethanizer tower 61, a bottoms holdup drum 63, a liquid transfer line 66 and vaporizer 67. In the case of this second hydrocarbon feed system, a by-pass line 56 is provided, fitted with a shutoff valve 57. Thus, provisions are present for either feeding the hydrocarbon introduced through the second hydrocarbon feed line 60 directly to the reaction zone by opening valve 57 and by-pass line 56, or alternatively for providing for demethanization of this fraction by closing valve 57 and opening valve 58 in line 60 which introduces this stream to the demethanizer 61.

In some instances a single hydrocarbon feed as such can be fed initially through the hydrochlorination zone, and in other instances separate feeds are combined and introduced to the hydrochlorination zone, the feed to the hydrochlorination zone being accompanied in all instances by a certain amount of recycle components as discussed more fully hereinafter. A compounding line 68 is provided for combining two initial hydrocarbon feeds into one major feed for introduction into the hydrochlorination step. The compounding line 68 is fitted with a valve 77 for closure if separate feeding is desired.

Numerous control devices and mechanisms are customarily incorporated in an installation to achieve automatic operation according to the method of the invention. Among such instruments are liquid level regulators 15, 64 for controlling the level of liquid in the holdup drums for the demethanized hydrocarbon feeds; flow regulator controller 24; analytical instrument 23; flow controller 41; flow controller 52; ratio adjuster 54; hydrogen chloride analyzer 80; vent controller 44; analyzer 51 and flow controller 49; and pressure controller 38.

In addition to the instrumentation indicated above, compressor equipment is frequently provided for various of the process streams, including, for example, a compressor 48 for the recycle hydrocarbon stream; and a compressor 75 for the overhead gases from the chlorination step.

To illustrate the operation of the process in a specific embodiment, the following describes the flows and conditions when a single process stream of hydrocarbon is fed to the system, said hydrocarbon containing an excess molar quantity of ethane with respect to ethylene. The stream is fed under a pressure normally ranging from 200 to 400 pounds per square inch into a tower 10 through the line 12, controlled by the valve 13. The tower 10 is provided to remove any quantities of lighter hydrocarbons which may be present in the hydrocarbon feed, particularly methane. This tower can be of any suitable type to effect this separation but preferably is operated at a pressure of from 400 to 600 pounds p.s.i.g. and at refrigerated temperatures, normally of the order of 10° F. to −70° F. The liquid ethylene and ethane are removed at the bottom of the column through the line 16 into a hold-up tank 14 which is preferably provided to even out small variations in the relative concentrations of ethane and ethylene fed into the tower 10, not compensated for by the recycle and vent operation discussed hereinafter. The liquid feed hydrocarbon is gasified thereafter in the depressurizer 7 which can also be a heat exchanger to cool the light hydrocarbon overhead of the tower 10. The feed hydrocarbon is then passed through the line 19 to a hydrochlorination reactor 20 for reaction with hydrogen chloride and additional ethane entering the reactor 20 through the line 22 discussed hereinafter. The ethane flow in the stream 19 is controlled by a flow regulator control 24 which is set to correspond to the ethylene in the fresh hydrocarbon feed in line 12 entering with the fresh hydrocarbon feed. The accuracy of this setting can be readily checked by a liquid level regulator 15 provided on the hold-up tank 14. The overhead effluent on the hydrochlorination reactor, containing predominantly ethyl chloride and ethane, can be passed directly to the chlorination reactor 40 but is preferably treated to remove essentially all of the ethyl chloride formed in the hydrochlorination reaction. For this purpose, the overhead is passed through the line 28 into the ethane separator tower 30 wherein substantially all of the ethyl chloride is liquefied and removed at the bottom of the tower through the line 32 to suitable purification equipment, not shown. Alternately, other methods of separation can be employed, such as scrubbing with a solvent having a preferential solubility for ethyl chloride, by absorption such as by using activated charcoal or the like. The ethane separator tower 30 is preferably maintained at a pressure somewhat below that in the hydrochlorination reactor, normally at a pressure of from 90 to 180 p.s.i.g. The temperature of this separator can range between about −40 and 100° F. The overhead gaseous stream from the separator 30 is removed through the line 34 and part of this stream is passed into the chlorination reactor 40 through the line 36.

The chlorine enters the system through the line 50 and its flow is controlled by flow regulator control 52 which is controlled by and is responsive to the control 24 through the control line 53 to maintain a constant relationship to the flow of ethylene through the line 19. The ethane feed to the chlorination zone 40 is controlled by and is responsive to the chlorine control 52, through the ratio controller 54.

The overhead from the chlorination reaction zone 40 is discharged through the line 70 to the hydrogen chloride stripper 72. A compressor 75 is provided in the line 70 to increase the pressure in the stripper 72 above the hydrochlorination reaction zone pressure. The stripper is maintained at refrigerated temperatures to liquefy the ethyl chloride and/or other chlorinated ethanes which are removed through line 73 to suitable purification equipment (not shown). The overhead, containing predominantly ethane and hydrogen chloride, are discharged to the hydrochlorination reaction zone 20 through the line 22.

A portion of the off-gas from the ethane separator 30 passes through the line 42 and at least a part thereof is recycled through the line 43 to the tower 10 or is vented or otherwise removed from the process through the line 46.

The pressure in the separator 30 is controlled by the pressure relief valve 38 in the line 34. The quantity of off-gas passed through the line 36 to the chlorination reaction is controlled by a flow regulator control 41. A pressure controller 44 is provided in the vent line 46 connected to line 42 which removes excess off-gas ethane from the hydrochlorination reaction.

The flow of ethane returning to the tower 10 is increased to system pressure by a compressor 48. Flow to the compressor is controlled by the valve 49 which is regulated in turn by an analyzer 51 in the line 11 which is responsive to the ethane content of the tower 10 bottoms stream. Thus, by the feed back of the ethane-rich gas stream in the line 43 to the tower 10, the ethane feed through the hydrochlorination reactor is maintained constant and any variations in the ethane content of the hydrocarbon feed are compensated for by variations in the quantity of ethane vented through the line 46.

When a single hydrocarbon feed stream is to be employed which does not initially contain copious amounts of methane, requiring the use of a demethanizer tower 10, the feed sequence can be altered by closing valve 9 and opening 8, thereby the hydrocarbon feed plus the recycle introduced thereto in line 43 is passed to line 11 and thence through line 19 to the hydrochlorination reactor 20 as above described. In such instances stability of the system can usually be maintained without the use of the supplemental analyzer equivalent to analyzer 51, particularly when the ethane and ethylene proportions of the initial hydrocarbon feed in line 12 are substantially constant.

As previously mentioned, numerous embodiments of the process involve two separate hydrocarbon supply streams, wherein one stream is predominantly ethylene, but contains appreciable amounts of ethane therein, and wherein the second hydrocarbon stream is predominantly ethane but is accompanied by an appreciable amount of methane and other impurities, or occasionally minor quantities of ethylene. In such cases the ethylene rich stream is fed through the system through line 12 as previously described. The second hydrocarbon stream, however, is fed through line 60 and is demethanized in column 61, passing to the bottoms liquid and holdup tank 63 for the concentrated ethane, which is passed then through line 66 into vaporizer 67 for vaporization. The vaporized ethane rich stream can then be passed through open valve 78 and into line 68, with valve 77 open, whereby this ethane component is blended with the first hydrocarbon feed stream and fed through line 19 to hydrochlorinator 20. The total ethane flow in the stream in line 19 is controlled by the flow regulator 24 which is set to correspond to the ethylene content in the fresh hydrocarbon feeds in the first and second streams jointly. In this embodiment of the over-all integrated process the demethanizing by-pass lines 56, 11 are blanked off by closing valves 8 and 57. Alternatively, when very little methane component requires removal, the demethanizing operation can be shut down by closing valves 9 and 58, and opening valves 8 and 57 whereby the hydrocarbon feed streams, as received, pass through lines 11, 19 and in the case of the second stream through lines 56, 71 and 68 in sequence.

In still another significant embodiment of the process, concentrated separate hydrocarbon feed streams are provided wherein a high concentration of ethylene is provided in the first hydrocarbon feed stream and a high concentration of ethane in the second hydrocarbon feed stream. In such instances the first, or ethylene rich and concentrated feed stream, is again fed through line 12 and demethanizer 10 if necessary, or alternatively through the demethanizing by-pass line 11. The second hydrocarbon stream, viz., the ethane rich stream is introduced through line 60 and may be passed through the demethanizer 61 if necessary for removal of methane, or alternatively through a demethanizing by-pass line 56. In either instance, however, the said second hydrocarbon stream is passed through line 56 and joins line 36 for combining with recycled ethane and is then introduced to the chlorination reactor. Other phases of the integrated operation are substantially identical as in preceding instances.

DESCRIPTION OF PROCESS CONTROL

In operation, the primary control of the essential process streams are all governed by a single setting, preferably based on the ethylene feed in line 19 to the hydrochlorination reaction. If desired, the same result can be obtained by setting the ethane flow in the same line, although this involves an indirect control and would be subject to additional variation due to impurities in the stream. From this control of the ethylene feed, the flow of the chlorine feed to the chlorination reactor can be set since it is necessarily directly proportional to the ethylene feed. The ethane feed to the chlorinator is then set and controlled from the chlorine feed. Thus, setting the chlorination feed, automatically assures an accurate control over the hydrogen chloride produced and fed to the hydrochlorination reactor.

The type of ethylene feed control used in the line 19 is not critical. A particularly suitable type involves the use of both an ethylene analyzer and a total gas flow recorder, both of which control the operation of a flow recorder, giving a reading or indication of the total ethylene feed entering the hydrochlorination reactor. The analyzer is preferably of the infrared type, well known and available commercially. Suitable flow recorders and flow regulators are equally well known and available.

The control of the ethane feed to the chlorination reactor can be similarly constructed, i.e. by employing an infrared analyzer to record or indicate the percentage of ethane in the stream, a flow regulator to determine the total gas flow and a flow recorder responsive to both the analyzer and the flow regulator to determine the total ethane feed to the chlorinator.

The chlorine control can also be governed and measured by a similar conventional flow regulator control valve.

The above control mechanism is entirely suitable for uniform hydrocarbon feed streams. However, as noted above, commercially available feed stocks are not sufficiently uniform, particularly regarding the ethane-ethylene ratio, to permit practical operation of a completed integrated plant. To compensate for such variations, excess ethane is employed in the process, above that fed to the chlorination reactor, which is either continuously vented from the process or recycled along with the fresh hydrocarbon stream or both. For this purpose, an ethylene or ethane analyzer, preferably the latter, is provided in the hydrochlorination feed line, following the tower 10, which controls a valve 49 in the ethane recycle line 43 to the tower 10. This analyzer can be of any suitable type, but preferably measures the percent ethane in the stream. In the event of a low ethylene concentration, the analyzer automatically effects a reduction in the recycle ethane feed by closing or partially closing the valve 49. Conversely, in the event that the ethylene concentration is high in the hydrochlorination feed, additional ethane is recycled to the system and less ethane is vented through the line 46.

In actual operation, a fine control or final adjustment over the process provides a highly accurate control over the ethylene concentration (ethylene/ethane ratio) either with or without recycle through the line 43. This is accomplished by controlling the system in response to variations in the quantity of ethane vented. For example, if the concentration of ethylene is reduced in the fresh hydrocarbon feed, the instantaneous make-up flow to the hydrochlorination reaction zone contains increased quantities of ethane. This will effect an increase in the quantity of ethane vented. The flow of ethane to the chlorination zone should be then regulated to reduce the ethane flow, thus maintaining a constant ethylene:total ethane ratio in the hydrochlorination reaction zone. The hydrogen chloride formed in the chlorination will also be excessive (because of the reduced ethylene), resulting in an increase in the hydrogen chloride in the hydrochlorination product stream. For fine control in operation, this stream is continuously analyzed for hydrogen chloride by the hydrogen chloride analyzer 80. The chlorine feed to the chlorination reaction zone must be correspondingly adjusted, preferably automatically. This technique provides a means of control over the ethylene concentration which is about 20 times as sensitive as a direct reading of the ethane and ethylene instruments, based on the total feed. Also, this mechanism provides a control over the chlorine feed which is approximately 30 times as sensitive as relying solely on the total ethylene feed to the hydrochlorination unit. These instruments can be used as references in manually setting the feed control valves or the valves can be actuated automatically by conventional control devices to continously effect compensating changes in the ethane and chlorine feed streams to the chlorination zone and to maintain a constant ethane-ethylene concentration in the hydrochlorination zone, as well as a controlled quantity of hydrogen chloride for reaction therewith.

HYDROCHLORINATION STEP

The hydrochlorination step involves a well known reaction in which ethylene and hydrogen chloride are reacted in the presence of a catalyst such as aluminum chloride, ferric chloride and other Friedel Craft catalyst at a temperature between about 20° C. and about 200° C. and at a pressure between about 2 and 30 atmospheres. The type of reactor employed in this hydrochlorination step will depend upon the particular conditions employed therein.

The details of the process are not important with respect to the present invention. In general, the process can be carried out in either a vapor phase or in solution. In the latter case, the catalyst is dissolved in ethyl chloride which is passed into a steel reactor containing an inert contact mass, e.g. ceramic Raschig rings to provide a large contact surface. The reactants, entering through a feed distributor, are dissolved in the reactor solution and the ethylene and hydrogen chloride react to form ethyl chloride. With a sufficient amount of active catalyst in the solution, the reaction is almost instantaneous. The effectiveness of the catalyst solution is determined qualitatively from the concentration of unreacted ethylene and hydrogen chloride in the gases leaving the reactor, the ethylene normally being only in trace quantities.

The catalyst in the hydrochlorination reactor must be replenished periodically to maintain efficient conversion. The amount of active catalyst in the reactors is depleted constantly by a side reaction proceeding concurrently with the formation of ethyl chloride, which forms a high boiling complex between the catalyst and ethylene. The formation of the complex, which is soluble in the reactor solution, renders the catalyst inactive.

It has been found that the hydrochlorination reaction operates considerably more efficient with respect to ethylene and catalyst utilization under operating conditions wherein excess quantities of hydrogen chloride of at least 1 percent and preferably 2 and 15 percent are employed. Thus, in carrying out the present integrated process it is essential that the hydrogen chloride formed in the chlorination step be very accurately controlled with respect to the ethylene feed to the hydrochlorination step to maintain this desirable and critical excess hydrogen chloride.

Additional hydrochlorination catalysts suitable for this invention are the chlorides of zinc, bismuth, boron, antimony and vanadium. While the catalyst concentration is not unduly critical, it is generally desired to maintain the concentration in a range of 0.1 to 1 weight percent and preferably from 0.1 to 0.5 weight percent, based upon the weight of ethylene.

CHLORINATION STEP

The chlorination step of the process can be conducted using a wide variety of conditions, including photochemical chlorination and thermal chlorination. The preferred operating conditions for these reactions are well known. The preferred type of chlorination involves a thermal reaction using a fluidized bed type of reactor in which a mass of finely divided inert solids are maintained in a fluidized state by the gas stream entering the reactor. The fluidized bed can be of a conventional type, e.g. stationary bed tubular reactor, etc. The process can employ any suitable fluidized mass or media and can utilize any desired temperature controlling means, either internal or external. In processes wherein it is desired to produce predominantly ethyl chloride in the chlorination step, it is frequently preferred to use adiabatic operation, i.e. wherein the heat of reaction is equivalent to the heat required to raise the temperature of the gases to reaction temperature.

The pressure in the chlorination step is not critical. Pressures in the range of 2 to 35 atmospheres are normally suitable although pressures between 5 and 20 atmospheres are more desirable. The best operation has been found to be between 7 and 15 atmospheres of pressure.

The maximum and minimum chlorination temperature is to some extent dependent on the operating pressure employed. In general, the temperature of chlorination should be maintained between about 300° C. and 650° C. When producing predominantly ethyl chloride, it is preferred to employ a temperature between about 400° C. and 450° C.

As noted above, the product from the chlorination reaction is dependent upon the chlorine:ethane feed ratio and in general can vary from about 0.15:1 to 2:1 or even higher when higher chlorinated ethanes are desired. For producing predominantly ethyl chloride, the ratio should normally exceed 0.15:1 and preferably should be between about 0.3:1 to 0.5:1.

When using a fluidized bed chlorination reactor a wide variety of fluidized materials are suitable. Normally, the materials should be inert toward the gas mixture under the reaction conditions employed. Sand or silicon carbide, free from catalytic impurities, consisting essentially of 50 to 250 mesh have been found particularly useful for this purpose. Other suitable and well known inert media which can be used are graphite, alumina, pumice, silica, Mullite, silica alumina gel, synthetic aluminum silica, porous earth such as kieselguhr or fuller's earth, and several other well known non-vesicular inert solid media.

The velocity of the reactant in the reaction zone is not critical, but should be adequate to support or fluidize the mass in the required suspended condition. A preferred range of gas velocity can be between about 0.3 to 3.0 feet per second. For finer particle sizes, the lower velocities are preferred.

WORKING EXAMPLES

The following examples are given to illustrate the benefits of the present invention but are in no way intended to limit the same. In these examples all weight units are given in moles/hour. The first example following represents operation of the process and the control method wherein a single hydrocarbon feed is supplied to the integrated process.

Example 1

In this operation, an ethylene-ethane containing feed stream is provided to the system through line 12, the feed gas having the following components and flows.

| | Moles/hour |
|---|---|
| Ethylene | 30 |
| Ethane | 35 |
| Methane | 20 |
| Inerts | 15 |

This feed stream is supplemented by a recycle through the line 43 giving a total feed to the demethanizer tower 10 as follows:

| | Moles/hour |
|---|---|
| Ethylene | 30 |
| Ethane | 38 |
| Methane | 20.3 |
| Inerts | 15 |
| Hydrogen chloride | 0.05 |

The hydrocarbon feed to the hydrochlorination reactor following demethanization contains the following:

| | Moles/hour |
|---|---|
| Ethylene | 30 |
| Ethane | 38 |
| Methane | 0.7 |
| Hydrogen chloride | 0.05 |

The recycle stream, containing ethane and hydrogen chloride, provided in the line 22 to the hydrochlorination reactor has the following components:

| | Moles/hour |
|---|---|
| Ethylene | 0.6 |
| Ethane | 76 |
| Methane | 11.3 |
| Hydrogen chloride | 32.6 |

The overhead in line 28 from the hydrochlorination reactor has the following composition:

| | Moles/hour |
|---|---|
| Ethylene | Trace |
| Ethane | 114 |
| Methane | 12 |
| Hydrogen chloride | 2 |
| Ethyl chloride | 27 |

Following separation of the ethyl chloride product, the overhead off-gas in the line 34 contains

| | Moles/hour |
|---|---|
| Ethylene | 0 |
| Ethane | 114 |
| Methane | 12 |
| Hydrogen chloride | 2 |

A part of this off-gas is passed through the line 36 to the chlorination reactor controlled by the flow regulator control 41 in response to the ethylene flow regulator control 24 and has the following composition:

| | Moles/hour |
|---|---|
| Ethylene | 0 |
| Ethane | 107 |
| Methane | 11.3 |
| Hydrogen chloride | 1.9 |

The chlorine (32.4 moles/hour) in this example is fed concurrently to the chlorination reactor through the line 50. The overhead from the chlorination reactor passing to the hydrogen chloride stripper through the line 70 contains

| | Moles/hour |
|---|---|
| Ethylene | 0.6 |
| Ethane | 76 |
| Methane | 11.3 |
| Hydrogen chloride | 33 |
| 1,1-dichloroethane | 1.2 |
| 1,2-dichloroethane | 0.13 |
| Ethyl chloride | 29 |

Essentially all of the ethyl chloride formed in the chlorination reaction is recovered from the bottom of the hydrogen chloride stripper 72 and is passed to suitable recovery apparatus through line 73.

The remaining quantity of the off-gas from the hydrochlorination reaction is passed through line 42, a part being recycled to the system by line 43 along with the fresh hydrocarbon feed as noted above and the remaining part is vented through the line 46.

As described above, the process of this invention can be integrated and controlled whereby, with a given ethylene feed, the several variables in the process can be automatically controlled to maintain continuous and uniform production from both the hydrochlorination and chlorination reactors. The only other major variable not automatically controlled is the quantity of low boiling impurities, e.g. methane, in the chlorination reaction. Normally, the methane concentration in the chlorinator should be maintained below about 15, preferably below 10 percent of the total chlorination hydrocarbon feed. The methane concentration can be easily controlled, if desired, thus making the process control fully automatic. Control of the methane concentration is accomplished by controlling the excess ethane feed to the hydrochlorinator in response to variations in the methane concentration, i.e. by varying the quantity of ethane recycled to the hydrochlorinator from the ethane stripper. This control can be automatically effected by a methane analyzer operating on the stream from the hydrochlorination reaction zone or off-gas from the ethane stripper. Any excess ethane in the fresh feed hydrocarbon is vented, as discussed above. Analyzers suitable for this purpose are well-known and available commercially, the infrared type being preferred.

In the foregoing operation, there is no necessity for utilizing the demethanizer by-pass line 11, consequently valve 8 is closed throughout the operation. Similarly, the apparatus employed when a second hydrocarbon feed stream is to be provided is also blanked off, thus the second demethanizing tower 61 and related equipment in lines are not employed. Thus valve 59 is closed, and also valves 57 and 77 are closed.

The following example illustrates an embodiment wherein the hydrocarbon feeds include an ethylene stream, of relatively dilute concentration, also containing appreciable quantities of ethane, and in addition a high concentrated ethane stream with quite minute quantities of ethylene component therein.

Example II

A primary fresh hydrocarbon feed is fed to a demethanizer 10 maintained at 550 p.s.i.g. through the line 12 and has the following composition and flow rate:

| | Moles/hour |
|---|---|
| Ethylene | 45 |
| Ethane | 17 |
| Methane | 9 |

In the tower 10, methane and other low boiling impurities are removed overhead, except for small quantities of methane and the liquefied ethane-ethylene fraction is passed into the hold-up tank 14. A secondary fresh hydrocarbon stream is concurrently fed to the demethanizer 61, through the line 60 at the following rate and proportions:

| | Moles/hour |
|---|---|
| Ethylene | Trace |
| Ethane | 29.5 |
| Methane | 93 |
| Inerts | 25.1 |

The flow regulator control 24 is set to maintain the flow of ethylene into the hydrochlorination reactor equivalent to the incoming fresh feed and is occasionally checked by reference to the level control 15. The flow of secondary hydrocarbon feed is controlled by the valve 25 to maintain a total flow into the hydrochlorination zone to provide an appreciable excess of ethane, relative to that required for reaction in the chlorination zone. In this example, the feed ethane is completely converted to the desired chlorinated product. Concurrently with the fresh feed to the hydrochlorination reactor, hydrogen chloride and ethane is fed to the hydrochlorination reactor 20 through the line 22 and contains

| | Moles/hour |
|---|---|
| Ethylene | 0.9 |
| Ethane | 114 |
| Methane | 12 |
| Hydrogen chloride | 49 |

The hydrochlorination reaction is carried out in the presence of catalytic quantities of aluminum chloride in liquid phase at a temperature of 133° F. and a pressure of about 150 p.s.i.g. A quantity of ethyl chloride is continuously recycled within this reactor. The overhead stream in line 28 has the following composition and flow rate:

| | Moles/hour |
|---|---|
| Ethylene | Trace |
| Ethane | 174 |
| Methane | 13 |
| Hydrogen chloride | 3 |
| Ethyl chloride | 40.7 |

This stream is discharged into the ethane stripper or ethyl chloride separator 30. The ethyl chloride product is removed at the bottom of the stripper and passed to a suitable purification and recovery apparatus such as fractionating towers. The overhead from the ethane stripping tower is taken off at a temperature of about −36° F. and at a pressure of 135 p.s.i.g. A part of the overhead stream is fed to the chlorination reactor through the line 36, the flow being controlled by the flow regulator 41. This stream contains

| | Moles/hour |
|---|---|
| Ethylene | 0 |
| Ethane | 160.5 |
| Methane | 12 |
| Hydrogen chloride | 2.8 |

The remaining off-gases from the hydrochlorination separator 30 is discharged through the line 42 and is returned to the line 60 through line 45 and valve 47. In this example, the controller valve 49 is closed and substantially no gases are vented through line 46. Chlorine (47.6 moles) is also fed into the chlorination reactor through the line 50 and is controlled by the flow regulator control 52. The chlorination is carried out at a temperature of 450° C., using a graphite fluidized bed. The pressure of the reaction is essentially atmospheric. The effluent gas from the chlorination reactor 40 has the following flow rate and components:

| | Moles/hour |
|---|---|
| Ethylene | 0.9 |
| Ethane | 114 |
| Methane | 12 |
| Hydrogen chloride | 49.6 |
| Ethyl chloride | 43.6 |
| 1,1-dichloroethane | 1.8 |
| Other | 0.19 |

The ethyl chloride (43.6 moles/hour) is removed from the bottom of the hydrogen chloride stripper and is thereafter purified by well-known means. The overhead stream from the hydrogen chloride stripper 72 is passed through the line 22 to the hydrochlorination reactor as noted above.

Example III

Example II is repeated except that the secondary feed gas contains essentially pure ethane. The primary feed rate and composition is as follows:

| | Moles/hour |
|---|---|
| Ethylene | 36 |
| Ethane | 29 |
| Methane | 25 |
| Inerts | 10 |

This stream is supplemented by a secondary feed through the line 60 with the following feed rate and composition:

| | Moles/hour |
|---|---|
| Ethylene | 0.2 |
| Ethane | 13.5 |

In providing this stream to the operations, the secondary stream is introduced through line 60, but the demethanizing tower 61 is bypassed by closing valve 58 and opening valve 57, thereby routing this hydrocarbon feed through line 56. From thence it is fed through line 71, by opening valve 76 and closing valve 78, and through crossover line 68 by opening valve 77, for joining the primary, demethanized stream in line 19 for feeding to the hydrochlorination reactor 20.

The hydrocarbon make-up feed to the hydrochlorination reactor 20 following demethanization contains the following:

| | Moles/hour |
|---|---|
| Ethylene | 36 |
| Ethane | 39 |
| Methane | 0.6 |

The recycle stream containing ethane and hydrogen chloride in the line 22 to the hydrochlorination reactor has the following rate and components:

| | Moles/hour |
|---|---|
| Ethylene | 0.6 |
| Ethane | 79.6 |
| Methane | 7.4 |
| Hydrogen chloride | 41.6 |

The overhead in line 28 from the hydrochlorination reactor has the following rate and composition:

| | Moles/hour |
|---|---|
| Ethylene | Trace |
| Ethane | 122 |
| Methane | 11 |
| Hydrogen chloride | 7 |
| Ethyl chloride | 32 |

Following separation of the ethyl chloride product, the overhead off-gas in the line 34 contains

| | Moles/hour |
|---|---|
| Ethylene | Trace |
| Ethane | 122 |
| Methane | 11 |
| Hydrogen chloride | 7 |

A part of this off-gas is passed through the line 36 to the chlorination reactor controlled by the flow regulator control 41 in response to the ethylene flow regulator control 54 and has the following rate and composition:

| | Moles/hour |
|---|---|
| Ethylene | 0 |
| Ethane | 112 |
| Methane | 7.4 |
| Hydrogen chloride | 6.5 |

The chlorine (34.9 moles/hour) in this example is fed concurrently to the chlorination reactor through the line 50. The overhead from the chlorination reactor passing to the hydrogen chloride stripper through the line 70 contains

| | Moles/hour |
|---|---|
| Ethylene | 0.6 |
| Ethane | 79.6 |
| Methane | 7.4 |
| Hydrogen chloride | 41.6 |
| 1,1-dichloroethane | 1.3 |
| 1,2-dichloroethane | 0.13 |
| Ethyl chloride | 30.4 |

Essentially all of the ethyl chloride formed in the chlorination reaction is recovered from the bottom of the hydrogen chloride stripper 72 and is passed to suitable recovery apparatus through line 73.

The remaining quantity of the off-gas from the hydrochlorination reaction is passed through line 42 to the vent line 46. No ethane is recycled to the system in this example, but frequently, as the primary hydrocarbon feed stream compositions change, variable amounts of ethane will be returned to line 60, as in Example II. As a further example of operation of the process, the following illustrates the embodiment wherein concentrated and separate ethylene and ethane hydrocarbon feeds are provided as the primary and secondary feed streams respectively.

*Example IV*

A concentrated primary fresh hydrocarbon feed stream predominating in ethylene is fed to the hydrochlorination reactor through line 12 at a flow rate such that the feed rate of the various hydrocarbon components of the stream was as follows:

| | Moles/hour |
|---|---|
| Methane | 1 |
| Ethylene | 95 |
| Ethane | 4 |

The flow regulator control 24 is set to maintain and record the flow of ethylene into the hydrochlorination reactor. Concurrently with the fresh feed to the hydrochlorination reactor, a hydrogen chloride-containing stream is also fed to the hydrochlorinator through line 22 having the following flow rate and composition:

| | Moles/hour |
|---|---|
| Methane | 82 |
| Ethylene | 1.8 |
| Ethane | 241 |
| Hydrogen chloride | 103.4 |

The hydrochlorination reaction is carried out in the presence of catalytic quantities of aluminum chloride dissolved in a reactor solution of ethyl chloride. An overhead stream is produced in line 28 having the following composition and flow rate:

| | Moles/hour |
|---|---|
| Ethane | 244 |
| Ethyl chloride | 85.5 |
| Methane | 83 |
| Hydrogen chloride | 6.3 |

This stream is discharged into the ethane stripper or ethyl chloride separator 30 where the ethyl chloride product is removed at the bottom of the stripper and passed to a suitable purification and recovery apparatus, such as fractionating towers. The overhead from the ethane stripping tower is taken off at a temperature of about −37° C. and at a pressure of about 8 atmospheres. A part of the overhead stream is fed to the chlorination reactor 40 through line 36. This stream has the following composition and flow rate:

| | Moles/hour |
|---|---|
| Methane | 66.5 |
| Ethane | 190 |
| Hydrogen chloride | 4.8 |

The remaining off-gases from the hydrochlorination separator 30 is vented from the system, the pressure relief valve 44 controlling this flow. The stream in line 36 is combined with a fresh concentrated secondary hydrocarbon stream which predominates in ethane in line 60 to form the combined ethane containing stream whose flow is controlled by flow regulator control 41 prior to its entry into the chlorination reactor 40. Chlorine (103 moles per hour) is also fed into the chlorination reactor through the line 50 and is controlled by the flow regulator control 52 which is set on the basis of the ethylene flow through line 19. By means of the ratio controller 54 any variation in the chlorine setting affects the flow of ethane from the line 36 into the chlorinator. The chlorination is carried out at a temperature of 450° C. using a graphite fluidized bed and a reaction pressure of about 7 atmospheres. The flow of chlorine and ethane to the chlorination reactor corresponds to an over-all mole ratio of 0.3:1, chlorine:ethane. The effluent from the chlorination reactor 40 has the following composition and flow rates:

| | Moles/hour |
|---|---|
| Methane | 82 |
| Ethylene | 1.8 |
| Ethane | 241.0 |
| Ethyl chloride | 92.0 |
| Hydrogen chloride | 104.5 |
| 1,1-dichloroethane | 3.8 |
| Others | 0.4 |

The stream 70 from the chlorinator is compressed to a pressure of about 12 atmospheres and fed to the hydrogen chloride stripper 72 where it is subjected to fractionation and condensation conditions such that the ethyl chloride is removed from the bottom of the stripper in line 73 and is thereafter purified by well-known means. The overhead stream from the hydrogen chloride stripper containing the uncondensed ethane, methane, and hydrogen chloride, is passed through line 22 to the hydrochlorination reactor 20 as noted above.

In this operation, none of the ethane is recycled to the system through the line 43; the control valves 47 and 49 in lines 45 and 43 are maintained in a closed position and all of the excess off-gas is vented through the pressure release control valve 44, through the line 46.

*Example V*

In this example, the ethane to ethylene mole ratio of the total composition of the primary and secondary hydrocarbon feed streams 12 and 22 is not high enough to provide the desirable excess of ethane, i.e. above about 15 percent, for the process, thereby requiring a recycle of a part of the off-gases from the ethane stripper 30 to the secondary hydrocarbon feed stream 60 in order to increase the ethane content of the feed stream.

A primary fresh hydrocarbon feed is fed to a demethanizer 10 maintained at 550 p.s.i.g. through the line 12 having the following composition and flow rate:

| | Moles/hour |
|---|---|
| Ethylene | 45 |
| Ethane | 17 |
| Methane | 29 |
| Hydrogen | 9 |

In the tower 10, methane and other low boiling impurities are removed overhead, except for small quantities of methane, and the liquefied ethane-ethylene fraction is passed into the hold-up tank 14. A secondary fresh hydrocarbon stream is concurrently fed to the demethanizer 61 through the line 60 at the following rate and proportions:

| | Moles/hour |
|---|---|
| Ethylene | Trace |
| Ethane | 29.5 |
| Methane | 93 |
| Hydrogen | 25.1 |

The flow regulator control 24 is set to maintain the flow of ethylene into the hydrochlorination reactor equivalent to the incoming fresh feed and is occasionally checked by reference to the level control 15. The secondary hydrocarbon feed is routed through valve 76, and lines 71 and 56 to the feed line 36 to the chlorination zone. The flow of this secondary hydrocarbon feed is controlled by a controller valve 84 to maintain a flow of ethane into the chlorination zone so as to provide an appreciable excess of ethane relative to that required for reaction in the chlorination reaction. Concurrently with the fresh feed to the hydrochlorination reactor, hydrogen chloride and ethane is fed to the hydrochlorination reactor 20 through the line 22 and contains the following composition and flow rate:

| | Moles/hour |
|---|---|
| Ethylene | 0.9 |
| Ethane | 114 |
| Methane | 14 |
| Hydrogen chloride | 49 |

The hydrochlorination reaction is carried out in the presence of catalytic quantities of aluminum chloride in liquid phase at a temperature of 56° C. and a pressure of about 11 atmospheres. A quantity of ethyl chloride is continuously recycled within this reactor. The overhead stream in line 28 has the following composition and flow rate:

| | Moles/hour |
|---|---|
| Ethylene | Trace |
| Ethane | 131 |
| Methane | 15 |
| Ethyl chloride | 40.5 |
| Hydrogen chloride | 3 |

This stream is discharged into the ethane stripper or ethyl chloride separator 30. The ethyl chloride product is removed at the bottom of the stripper and passed to a suitable purification and recovery apparatus such as fractionating towers. The overhead from the ethane separating tower is taken off at a temperature of about −38° C and at a pressure of about 10 atmospheres. A part of the overhead stream is fed to the chlorination reactor through the line 36 and has the following composition and flow rate:

| | Moles/hour |
|---|---|
| Ethylene | Trace |
| Ethane | 131 |
| Methane | 15 |
| Hydrogen chloride | 3.0 |

This stream combines with the secondary hydrocarbon feed stream provided in line 69 prior to the flow regulator 41 which controls the total ethane flow into the chlorination reactor 40. After combining with the secondary hydrocarbon feed stream the stream entering the chlorinator now has the following composition and flow rate:

| | Moles/hour |
|---|---|
| Ethylene | Trace |
| Ethane | 160.5 |
| Methane | 14.4 |
| Hydrogen chloride | 3.0 |

The remaining off-gases from the ethane separator 30 are discharged through the line 43 and returned to the line 60 through line 45 and valve 47. In this example, the controller valve 49 is closed, and no gases are vented through line 46. Chlorine (47.6 moles per hour) is also fed into the chlorination reactor through the line 50 and is controlled by the flow regulator control 52. The chlorination is carried out at a temperature of 450° C. using a graphite fluidized bed. The pressure of the reaction is maintained at about 7 atmospheres. The effluent gas from the chlorination reactor 40 has the following flow rate and composition:

| | Moles/hour |
|---|---|
| Ethylene | 0.9 |
| Methane | 14.4 |
| Ethane | 114 |
| Ethyl chloride | 43.6 |
| Hydrogen chloride | 49.6 |
| 1,1-dichloroethane | 1.8 |
| Other | 0.19 |

The ethyl chloride (43.6 moles per hour) is removed from the bottom of the hydrogen chloride stripper. The overhead stream from the hydrogen chloride stripper is passed through the line 22 to the hydrochlorination reactor as noted above.

It will be understood that the operations of Examples IV and V are frequently and automatically varied with minor changes in fresh feed compositions. Thus, if the supply of ethane were cut back in Example IV, then the amount of gases vented through line 46 would be decreased and portions would be recycled through line 43 and line 47. Similarly, if the concentration of ethane in the ethane feed stream in Example V were increased, then the recycle through line 43 would be reduced and venting of excess through line 46 would occur.

As shown by the examples above, the principles of the present invention are applicable for a variety of feed types and conditions. With a given ethylene feed, the several variables in the process can be automatically controlled to maintain continuous and uniform production from both the hydrochlorination and chlorination reactors. The only other major variable not automatically controlled is the quantity of low boiling impurities, e.g. methane, in the chlorination reaction. Normally, the methane concentration in the chlorinator should be maintained below about 15 percent, preferably below 10 percent of the total hydrocarbon chlorination feed. The methane concentration can be easily controlled, if desired, by controlling the ethane-ethylene ratio, as by controlling the ethane-rich secondary feed to the chlorination or the recycle to the feed stream. This control can be automatically effected by a methane analyzer. The excess methane in any case is either vented or recycled to a demethanizer or both. The methane analyzer is preferably positioned in the hydrocarbon feed line to the chlorination or in the recycle line. Analyzers suitable for this purpose are well-known and available commercially, the infrared type being preferred.

The present invention has been discussed principally in relation to a preferred process wherein essentially complete reaction of ethylene with hydrogen chloride is obtained in a single pass through the hydrochlorination reactor. The present process for control of the integrated process is equally applicable to processes in which relatively inactive hydrochlorination catalysts are employed or, as in the case of aluminum chloride, when relatively low catalyst concentrations are used. The control system is identical, the unreacted ethylene in the hydrochlorination reaction product is merely recycled through the chlorination reactor and returned to the hydrochlorination reaction. Using such operation, some ethylene will be lost if the excess ethane is vented. Thus, it is preferred to recycle the excess gases, not passed through the chlorination reaction, to a demethanizer for reuse in the process.

This application is a continuation-in-part of prior patent applications Serial Nos. 474,786; 474,832; and 474,834, all filed December 13, 1954 and all now abandoned.

The ethyl chloride produced in this invention has a wide variety of uses, particularly as a solvent and as an intermediate in the manufacture of tetraethyllead used as an antiknock in gasoline. The higher alkyl chlorides which are produced or can be produced in the chlorination reaction likewise have many uses including the use as intermediates in the manufacture of monomers for polymeric materials such as vinyl chloride and vinylidene chloride. These higher chlorination alkenes are also useful as solvents and degreasing agents.

What is claimed is:

1. An integrated hydrochlorination-chlorination process for the manufacture of ethyl chloride and an improved process control and recovery method as later defined, the process comprising providing an ethylene feed component stream and an ethane feed component stream, feeding the ethylene component and a process-generated hydrogen chloride stream, accompanied by ethane, to a pressurized hydrochlorination reactor, the hydrogen chloride being in molar excess to the ethylene, and hydrochlorinating the ethylene therein and thereby forming a hydrochlorination product stream including ethane, excess hydrogen chloride, and ethyl chloride recovering a major part of the ethyl chloride therefrom and dividing the resultant ethane component stream into a first and major portion and at least one minor portion, combining the first and major portion with chlorine and ethane feed component as required, and feeding said combined stream to a pressurized chlorination zone and chlorinating part of the ethane therein, forming thereby a chlorination product stream including ethyl chloride and other chloroethanes, hydrogen chloride and unreacted ethane, separating at least part of the chloroethane components therefrom, and recycling the resultant hydrogen-chloride-ethane containing stream to the hydrochlorination zone as above defined; the control method including a primary control comprising determining the ethylene flow to the hydrochlorination reactor and adjusting the chlorine feed to the chlorination zone responsive to said ethylene feed to provide at least a molar equivalent thereto, and controlling the flow of ethane to the chlorination zone to maintain an approximately uniform ethane to chlorine ratio greater than unity, a supplementary control comprising determining the hydrogen chloride in the hydrochlorination products and inversely adjusting the chlorine feed to the chlorination reactor to maintain a uniform amount of said hydrogen chloride, and maintaining uniform supra-atmospheric pressures by controlled venting of a minor portion of the said ethane component stream.

2. An integrated hydrochlorination-chlorination plant process for the manufacture of ethyl chloride and an improved process control and recovery method as later defined, the process including supplying a single hydrocarbon feed stream including ethylene and ethane, adding thereto a recycle ethane stream as hereinafter defined and feeding with a recycle stream including ethane and process-generated hydrogen chloride to a hydrochlorination reaction zone, the hydrogen chloride being in molar excess of the ethylene, and hydrochlorinating the ethylene in said zone under pressurized catalytic conditions, to form a gaseous hydrochlorination product stream including ethyl chloride, excess hydrogen chloride, and ethane, recovering a major portion of the ethyl chloride from said product stream, and then passing a first and major portion of the resultant ethane component stream to a chlorination zone, mixing with chlorine and chlorinating to form a product gas including ethyl chloride and other chloroethanes, hydrogen chloride and unreacted ethane, and passing a first part of a second and minor portion of the ethane component stream to mix in part with the ethane-ethylene components of the feed stream, and passing the hydrogen chloride components of the chlorination product to the hydrochlorination zone; the control method including a primary control comprising adjusting the quantity of said first part of the second portion of ethane component stream to provide a substantially uniform ethylene to ethane proportion concentration in the hydrocarbon feed to the hydrochlorination reaction, determining the ethylene fed to the hydrochlorination reaction and adjusting the chlorine feed rate to correspond to at least the molar feed of ethylene to the process, and regulating the rate of ethane component feed to the chlorination reactors to maintain a preselected ethane to chlorine feed ratio greater than unity, a supplementary control comprising determining the hydrogen chloride component in the hydrochlorination reaction products and inversely adjusting the chlorine rate to maintain a substantially uniform concentration of said hydrogen chloride, and an over-all control to maintain uniform supraatmospheric pressure levels in the process comprising venting from the system a second part of the said second and minor portion of the ethane component stream.

3. An integrated hydrochlorination-chlorination process and an improved control and recovery method therefor, the process comprising providing an ethylene feed stream having appreciable but variable amounts of ethane therein, and an ethane rich feed stream, feeding the ethylene feed stream, the ethane rich feed stream and two recycle streams as hereafter defined to a pressurized hydrochlorination zone, one of said recycle streams including ethane and hydrogen chloride, the hydrogen chloride being in excess of the ethylene, hydrochlorinating the ethylene in said zone, forming thereby a hydrochlorination product stream including ethane, excess hydrogen chloride and ethyl chloride, recovering a major part of the ethyl chloride therefrom and separating the resultant ethane component stream into a first and major portion and a second and minor portion, mixing said major portion with chlorine and thermally chlorinating part of the ethane in a pressurized chlorination zone, forming thereby a chlorination product stream including ethyl chloride and other chloroethanes, hydrogen chloride and unreacted ethane, recovering at least part of the chloroethane components therefrom, and recycling the resultant hydrogen chloride-ethane containing stream to the hydrochlorination zone as above defined, and recycling a first part of the second and minor portion of the ethane component stream to the hydrochlorination zone as above defined; the control method including a primary control comprising determining the ethylene feed and adjusting the chlorine feed to the chlorination to correspond to at least the molar feed of ethylene to the hydrochlorination, controlling the flow of the first and major portion of the ethane component stream to the chlorination in response to the chlorine feed to maintain an approximately uniform ethane to chlorine ratio greater than unity, mixing the first part of the second and minor portion of the ethane component stream with the ethane feed stream, and passing said combined stream to the ethylene feed stream at a rate in response to the ethylene concentration of the so-produced stream to provide a uniform ethylene to ethane ratio therein, a supplementary control comprising determining the hydrogen chloride in the hydrochlorination products and inversely adjusting the chlorine feed to the chlorination reactor to maintain a uniform amount of said hydrogen chloride, and maintaining uniform supraatmospheric process pressures by controlled venting of the second part of the second and minor portion of the ethane component stream.

4. An integrated hydrochlorination-chlorination process for the manufacture of ethyl chloride and other chloroethanes and a control and recovery method therefor, the process including supplying an ethylene rich feed stream and an ethane rich feed stream, feeding the ethylene feed stream and a recycle stream to a pressurized hydrochlorination zone, said recycle including process generated hydrogen chloride in molar excess of the ethylene feed, and ethane, hydrochlorinating the ethylene in said zone and forming thereby a hydrochlorination product stream including ethane, excess hydrogen chloride and ethyl chloride, recovering a major part of the ethyl chloride therefrom and dividing the resultant ethane component stream into a first and a major portion and a second and minor portion, mixing said major portion with the ethane feed and with chlorine and thermally chlorinating part of the ethane in said mixed stream in a pressurized chlorination zone, forming thereby a chlorination product stream including ethyl chloride and other chloroethanes, hydrogen chloride and unreacted ethane, recovering at least part of the chloroethane components therefrom, and recycling the resultant hydrogen chloride-ethane containing stream to the hydrochlorination zone as above defined and venting the second and minor portion of the ethane component stream; the control method including a primary control comprising determining the ethylene flow to the hydrochlorination zone and adjusting the chlorine feed to the chlorination zone responsive to said ethylene feed to provide at least a molar equivalent thereto, controlling the flow of the combined fresh ethane feed and the first and major portion of the ethane component stream in proportion to the chlorine feed to maintain an approximately uniform ethane to chlorine ratio greater than unity and sufficiently large to provide unreacted ethane for recycling at least equal to the ethane reacted in the chlorination, and adjusting the fresh ethane feed rate to correspond to at least a 15 percent excess over the ethane reacted in the chlorination zone, a supplementary control comprising determining the hydrogen chloride in the hydrochlorination products and inversely adjusting the chlorine feed to the chlorination zone to maintain a uniform amount of said hydrogen chloride, and an overall control comprising maintaining uniform supraatmospheric process pressures by venting the second and minor portion of the ethane component stream.

References Cited in the file of this patent

UNITED STATES PATENTS

| | | |
|---|---|---|
| 1,242,208 | Lacy | Oct. 9, 1917 |
| 2,099,480 | Hjerpe et al. | Nov. 16, 1937 |
| 2,246,082 | Vaughan et al. | June 17, 1941 |
| 2,709,678 | Berger | May 31, 1955 |

FOREIGN PATENTS

| | | |
|---|---|---|
| 639,435 | Great Britain | June 28, 1950 |